United States Patent [19]
Liu

[11] Patent Number: 6,100,822
[45] Date of Patent: Aug. 8, 2000

[54] OPTICAL SENSING SYSTEM USING MULTIPLE DETECTORS AT VARIOUS POSITIONS FOR GENERATING POSITION SIGNALS

[75] Inventor: Shu-Ming Liu, Taipei, Taiwan

[73] Assignee: Primax Electronics Ltd., Taipei Hsien, Taiwan

[21] Appl. No.: 09/034,170

[22] Filed: Mar. 2, 1998

[51] Int. Cl.[7] .................................................. H03M 1/22
[52] U.S. Cl. ..................... 341/9; 341/1; 341/8; 341/9; 341/13; 341/15
[58] Field of Search .............................. 356/372; 341/13, 341/11, 8, 9, 15, 1; 250/231.14, 231.18; 340/347; 116/31

[56] References Cited

U.S. PATENT DOCUMENTS 4,947,166  8/1990  Wingate et al. ............................ 341/13

*Primary Examiner*—Frank G. Font
*Assistant Examiner*—Armando Rodriguez

[57] ABSTRACT

The present invention discloses an optical sensing system which uses a plurality of detectors installed at various positions next to an optical panel to generate a position signal for indicating the position of the optical panel. The optical sensing system has an optical panel having a plurality of sensing areas each having a plurality of encoding holes arranged in a predetermined direction, a sensing device having a plurality of detectors for detecting movements of the optical panel corresponding to the sensing device, each of the detectors being corresponded to one of the sensing areas of the optical panel for detecting movements of the encoding holes along the predetermined direction and generating correspondent sensing signals, and a control circuit electrically connected to the sensing device for collecting the sensing signals generated by the detectors of the sensing device to form a position signal so as to indicate the optical panel's position.

13 Claims, 3 Drawing Sheets

OPTICAL SENSING SYSTEM USING MULTIPLE DETECTORS AT VARIOUS POSITIONS FOR GENERATING POSITION SIGNALS

Optical sensing system using multiple detectors at various positions for generating position signals

BACKGROUND OF THE INVENTION

1. Field of the Invention

The present invention relates to an optical sensing system, and more particularly, to an optical sensing system which uses a plurality of detectors installed at various positions next to an optical panel to generate a position signal for indicating the position of the optical panel.

2. Description of the Prior Art

Please refer to FIG. 1 and FIG. 2. FIG. 1 is a perspective view of a prior art optical sensing system 10. FIG. 2 is a position signal table 22 of the optical sensing system 10.

The optical sensing system 10 comprises a rotatable circular panel 12, and a sensing device 14 for detecting rotations of the panel 12. The panel 12 comprises a plurality of encoding hole sets 11 discontinuously installed along various radial directions of the panel 12, and thus the sensing device 14 can generate a position signal 29 for each of the encoding hole sets 11 of the panel 12 in a discontinuous manner.

The sensing device 14 comprises three sensors 16, 18, 20 for detecting light passing through each encoding hole set 11 and generating correspondent sensing signals 24, 26 and 28. The three sensing signals 24, 26, 28 form a position signal 29 representing one position of the panel 12. Each encoding hole set 11 comprises one to three encoding holes arranged along one radial direction of the panel 12 and positioned along three circular tracks of the panel 12. The signal 24 generated by the sensor 16 at the outer track represents the least significant bit, and the signal 28 generated by the sensor 20 at the inner track represents the most significant bit.

If number of positions of the panel 12 is to be increased in order to increase the resolution of the optical sensing system 10, the maximum number of encoding holes within each encoding hole set 11 and also the number of sensors of the sensing device 14 have to be increased. Since the length of the inner track is much shorter than the outer track shown in FIG. 1, it is quite difficult to install more encoding holes along another track which is even shorter than inner track. Besides, when the number of sensors in the sensing device 14 is increased, its cost will be increased dramatically since the sensing device will have to be custom made.

SUMMARY OF THE INVENTION

It is therefore a primary objective of the present invention to provide an optical sensing system in which installation of the encoding holes will not be limited by the shorter inner track as the encoding holes are installed closer to the center of the panel, and cheaper sensing devices can be used for detecting rotations of the encoding holes.

In a preferred embodiment, the present invention comprises an optical sensing system comprising:

an optical panel comprising a plurality of sensing areas, each sensing area comprising a plurality of encoding holes arranged in a predetermined direction;

a sensing device having a plurality of detectors for detecting movements of the optical panel corresponding to the sensing device, each of the detectors being corresponded to one of the sensing areas of the optical panel for detecting movements of the encoding holes along the predetermined direction and generating correspondent sensing signals; and a control circuit electrically connected to the sensing device for collecting the sensing signals generated by the detectors of the sensing device to form a position signal so as to indicate the optical panel's position.

The optical sensing system further comprises a chassis wherein the optical panel is rotatably mounted in the chassis, and the sensing device is also mounted in the chassis for detecting rotations of the optical panel. The optical panel comprises a circular panel wherein the sensing areas of the optical panel are installed around a center of the circular panel, and the encoding holes of each sensing area are arranged along a circumference direction of the circular panel.

It is an advantage of the present invention that there are multiple sensing areas installed around the circular panel and multiple detectors installed next to the circular panel for detecting movements of encoding holes within each sensing area. The resolution of the optical sensing system can be increased by increasing the number of sensing areas around the periphery of the circular panel instead of installing more encoding holes along a shorter circular track close to the center of the circular panel.

It is another advantage of the present invention that when more sensing areas are installed, the number of arrays within each sensing area can be decreased and thus the number of sensors needed to detect movements of the encoding holes within each sensing area can also be decreased. Detecting devices with less sensors are much cheaper than detecting devices with more sensors and thus the cost of the optical sensing system can be reduced.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figures 1, 2:
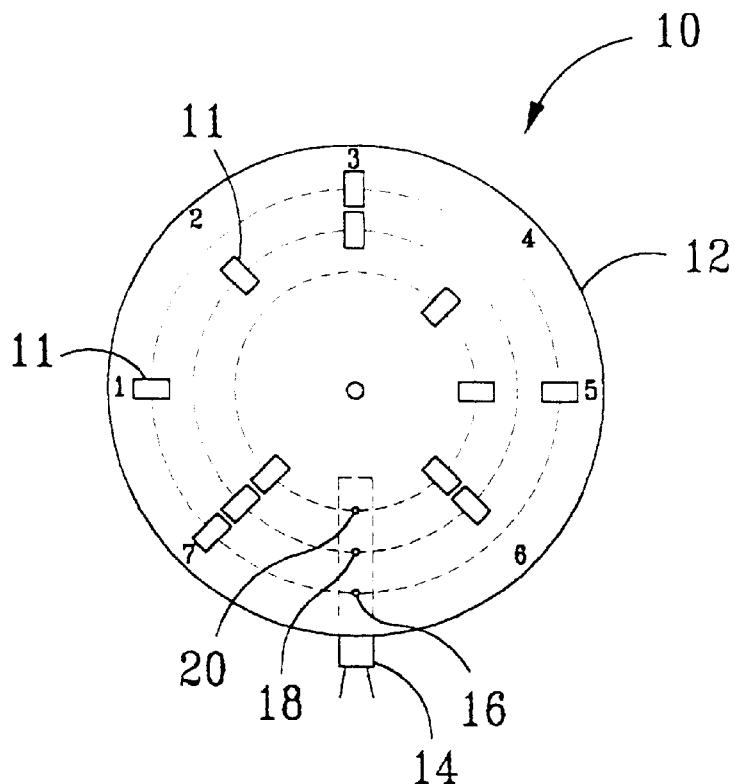
FIG. 1 is a perspective view of a prior art optical sensing system.
FIG. 2 is a position signal table of the optical sensing system shown in FIG. 1.
Figures 3, 4:
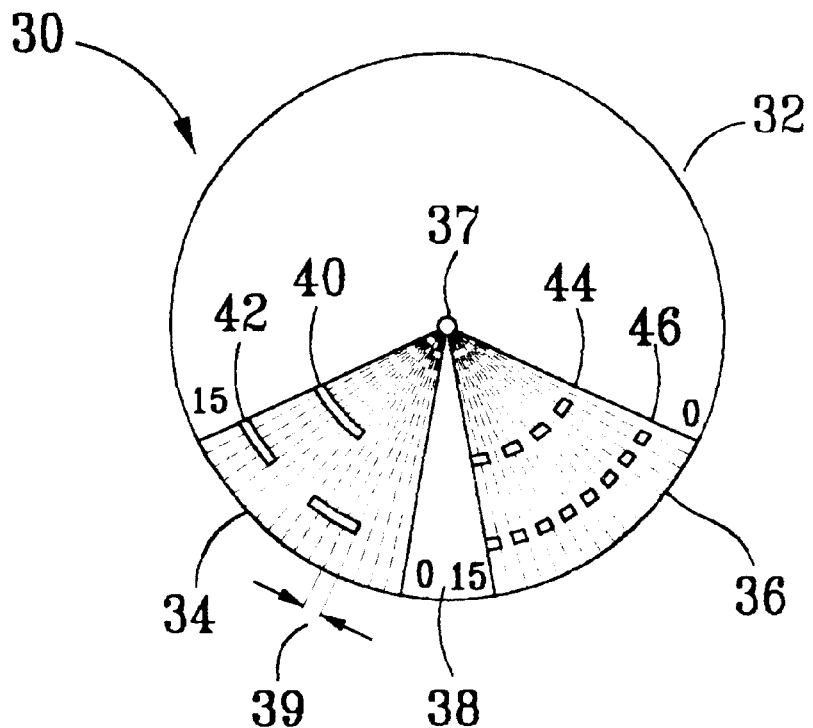
FIG. 3 is a perspective view of an optical panel according to the present invention.
FIG. 4 is a position signal table of the optical panel shown in FIG. 3.
Figure 5:
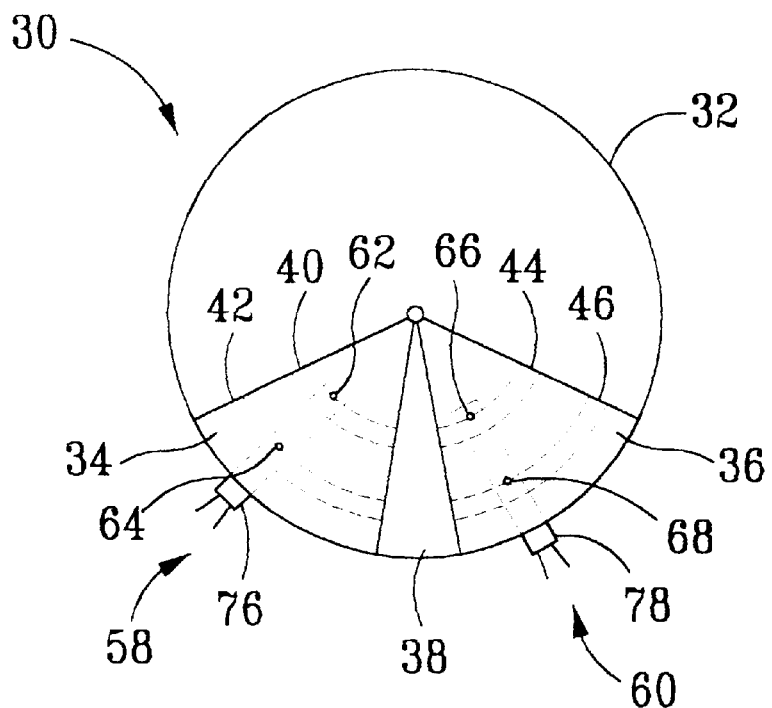
FIG. 5 is a perspective view of an optical sensing system according to the present invention.

Please refer to FIGS. 3 to 5. FIG. 3 is a perspective view of an optical panel 32 according to the present invention. FIG. 4 is a position signal table 48 of the optical panel 32. FIG. 5 is a perspective view of an optical sensing system 30 according to the present invention.

The optical sensing system 30 comprises a circular optical panel 32 having two non-overlapping fan-shaped sensing areas 34 and 36, and a sensing device comprising two detectors 58 and 60 separately positioned corresponding to the two sensing areas 34 and 36 for detecting movements of the two sensing areas 34 and 36 and generating correspondent position signals 57 as shown in the table 48.

The two sensing areas 34 and 36 are installed around a center 37 of the optical panel 32 with equal angular dimension, and the optical panel 32 is only allowed to move within the angular dimension. The optical panel 32 further comprises a buffer zone 38 positioned between the two sensing areas 34 and 36. Each of the sensing areas 34 and 36 comprises two arrays of encoding holes 40, 42 and 44, 46 arranged along two circular tracks of the optical panel 32.

The circumference of the optical panel 32 is divided into a plurality of equal angular units 39, and the numbers of the angular units 39 of the two sensing areas 34 and 36 are the same. In the present embodiment, there are sixteen angular units 39 in each of the sensing areas 34 and 36, and size of each encoding hole in the sensing areas 34 and 36 is made according to each angular unit 39 and each encoding hole is positioned within the boundaries of each angular unit 39.

The detectors 58 and 60 are installed corresponding to the two sensing areas 34 and 36 for detecting movements of the arrays of the encoding holes 40, 42 and 44, 46 along the circumference direction of the optical panel 32. Each detector 58 and 60 comprises a light source (not shown) installed at one side of the sensing areas 34 or 36 for emitting light toward the sensing areas 34 or 36, and a light detecting device 76 or 78 installed at another side of the sensing areas 34 or 36 for detecting light passing through the arrays of the encoding holes 40, 42 and 44, 46. Each light detecting device comprises a number of light sensors corresponding to the number of arrays of each sensing areas for detecting movements of the encoding holes. In the present embodiment, the light detecting device 76 comprises two light sensors 62 and 64, and the light detecting device 78 comprises two light sensors 66 and 68. The two detecting devices 76 and 78 generate the sensing signals 50, 52 and 54, 56 corresponding to the encoding hole arrays 40, 42 and 44, 46. The four sensing signals 50, 52, 54 and 56 form a position signal 57 for indicating the position of the optical panel 32.

Figure 6:
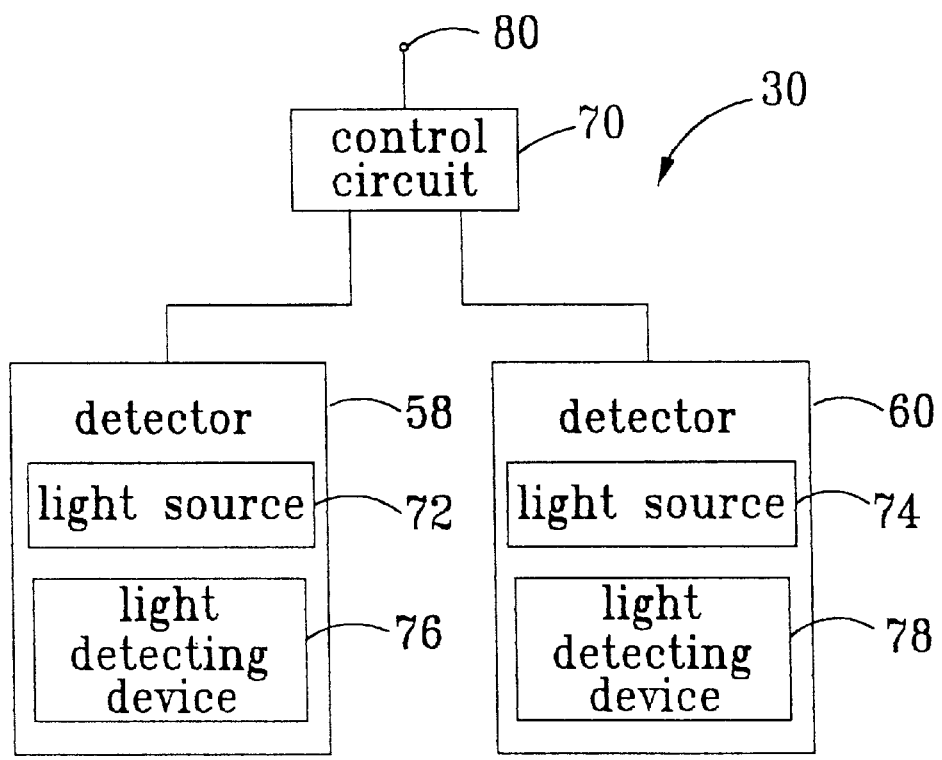
FIG. 6 is a function block diagram of the optical sensing system shown in FIG. 5.

Please refer to FIG. 6. FIG. 6 is a function block diagram of the optical sensing system 30. The optical sensing system 30 comprises two detectors 58 and 60, and a control circuit 70 electrically connected to the two detectors 58 and 60. The detector 58 comprises a light source 72, and the light detecting device 76 for detecting the light emitted from the light source 72 that passes through the encoding holes 40, 42. The light detecting device 76 generates sensing signals 50, 52 that correspond to the encoding holes 40, 42, respectively. The detector 60 comprises a light source 74, and the light detecting device 78 for detecting the light emitted from the light source 74 that passes through the encoding holes 44, 46. The light detecting device 78 generates sensing signals 54, 56 that correspond to the encoding holes 44, 46, respectively. generated by the two detectors 58 and 60 will be collected by the control circuit 70 to form a position signal 57 over the output port 80.

When the optical panel 32 is rotated, the two sensing areas 34 and 36 of the optical panel 32 will be rotated along the circumference direction of the optical panel 32 in the same time. The two detectors 58 and 60 at two different positions next to the optical panel 32 will detect the movement of the arrays of the encoding holes 40, 42 and 44, 46 in the sensing areas 34 and 36 along the circumference direction of the optical panel 32, and generate correspondent sensing signals 50, 52 and 54, 56. Because the arrays of encoding holes 40, 42 and 44, 46 are continuously positioned along the circumference of the optical panel 32, the detectors 58 and 60 will continuously generate the sensing signals 50, 52, 54 and 56, and the control circuit 70 will also continuously generate the position signals 57 according to the generated sensing signals 50, 52, 54, 56.

The number of sensing areas on the optical panel 32 and correspondent detectors can be increased to increase the resolution of the optical sensing system 30, and the number of arrays in each sensing area is the same as the number of light sensors in each correspondent detector. If the number of light sensors of the optical sensing system 30 is n, then the maximum number of angular units in each sensing area is $2^n$. Each of the angular units can generate a unique position signal, and these n sensors are evenly distributed to each of the sensing areas.

As shown in FIG. 4 and FIG. 5, the optical sensing system 30 comprises four light sensors 62, 64, 66, and 68 evenly installed in the two sensing areas 34 and 36. Each of the sensing areas 34 and 36 comprises two arrays of encoding holes 40, 42 or 44, 46. If the encoding holes are properly arranged, the position signal 57 generated by each angular unit 39 will be different from the position signal 57 generated by a neighboring angular unit 39. Besides, each of the position signals 57 shown in FIG. 4 has a different combination of the sensing signals 50, 52, 54 and 56, and thus the position signals 57 generated by the control circuit 70 can accurately indicate a unique position of the optical panel 32.

Comparing to the prior art optical panel 10, the four arrays of the encoding holes 40, 42, 44 and 46 are evenly distributed in the two sensing areas 34 and 36. The resolution of the optical sensing system can be increased by increasing the number of sensing areas around the periphery of the circular panel instead of installing more encoding holes along a shorter circular track close to the center of the circular panel. Besides, when more sensing areas are installed, the number of arrays within each sensing area can be decreased and thus the number of light sensors in each detector can also be decreased. Detectors with less light sensors are much cheaper than detectors with more light sensors and thus the cost of the optical sensing system can be reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical sensing system comprising:

an optical panel comprising a plurality of sensing areas, each sensing area comprising a plurality of encoding holes arranged in a predetermined direction;

a sensing device having a plurality of detectors for detecting movements of the optical panel corresponding to the sensing device, the detectors having a one-to-one correspondence with the sensing areas for detecting movements of the encoding holes along the predetermined direction and generating correspondent sensing signals; and a control circuit electrically connected to the sensing device for collecting the sensing signals generated by the detectors of the sensing device to form a position signal so as to indicate the optical panel's position.

2. The optical sensing system of claim 1 further comprising a chassis wherein the optical panel is rotatably mounted in the chassis, and the sensing device is also mounted in the chassis for detecting rotations of the optical panel.

3. The optical sensing system of claim 2 wherein the optical panel comprises a circular panel wherein the sensing areas of the optical panel are installed around a center of the circular panel, and the encoding holes of each sensing area are arranged along a circumference direction of the circular panel.

4. The optical sensing system of claim 3 wherein the optical panel further comprises an axle installed perpendicularly on a center of the circular panel and the axle of the optical panel is rotatably mounted on the chassis.

5. The optical sensing system of claim 3 wherein the sensing areas of the optical panel are installed around the center of the circular panel with equal angular dimension.

6. The optical sensing system of claim 5 wherein the circular panel can only be rotated within the angular dimension.

7. The optical sensing system of claim 5 wherein each sensing area comprises at least one array of encoding holes arranged along the circumference direction of the circular panel, and each array of encoding holes comprises at least one encoding hole.

8. The optical sensing system of claim 7 wherein each detector of the sensing device comprises a light source installed at one side of the corresponded sensing area, and a light detecting device installed at another side of the correspondent sensing area for detecting light emitted from the light source passing through the encoding holes of the sensing area and generating the correspondent sensing signals.

9. The optical sensing system of claim 8 wherein the light detecting device comprises one light sensor for each array of encoding holes of the corresponded sensing area for detecting movements of the encoding holes in the corresponded array.

10. The optical sensing system of claim 9 wherein the circumference of the circular panel is divided into a plurality of equal angular units, and each of the sensing areas has the same number of angular units.

11. The optical sensing system of claim 10 wherein each of the encoding holes is made according to the angular units so that the control unit can only generate one position signal for each angular unit.

12. The optical sensing system of claim 11 wherein the position signals generated by two neighboring angular units are different.

13. The optical sensing system of claim 11 wherein the position signals generated by all the angular units are different.

* * * * *